3,152,094
PRODUCTION OF POLYURETHANES USING
AN IMIDAZOLE CATALYST
William E. Erner, Wilmington, Del., and Harold A.
Green, Elkins Park, Pa., assignors to Air Products
and Chemicals, Inc., a corporation of Delaware
Filed Aug. 26, 1960, Ser. No. 52,053
23 Claims. (Cl. 260—2.5)

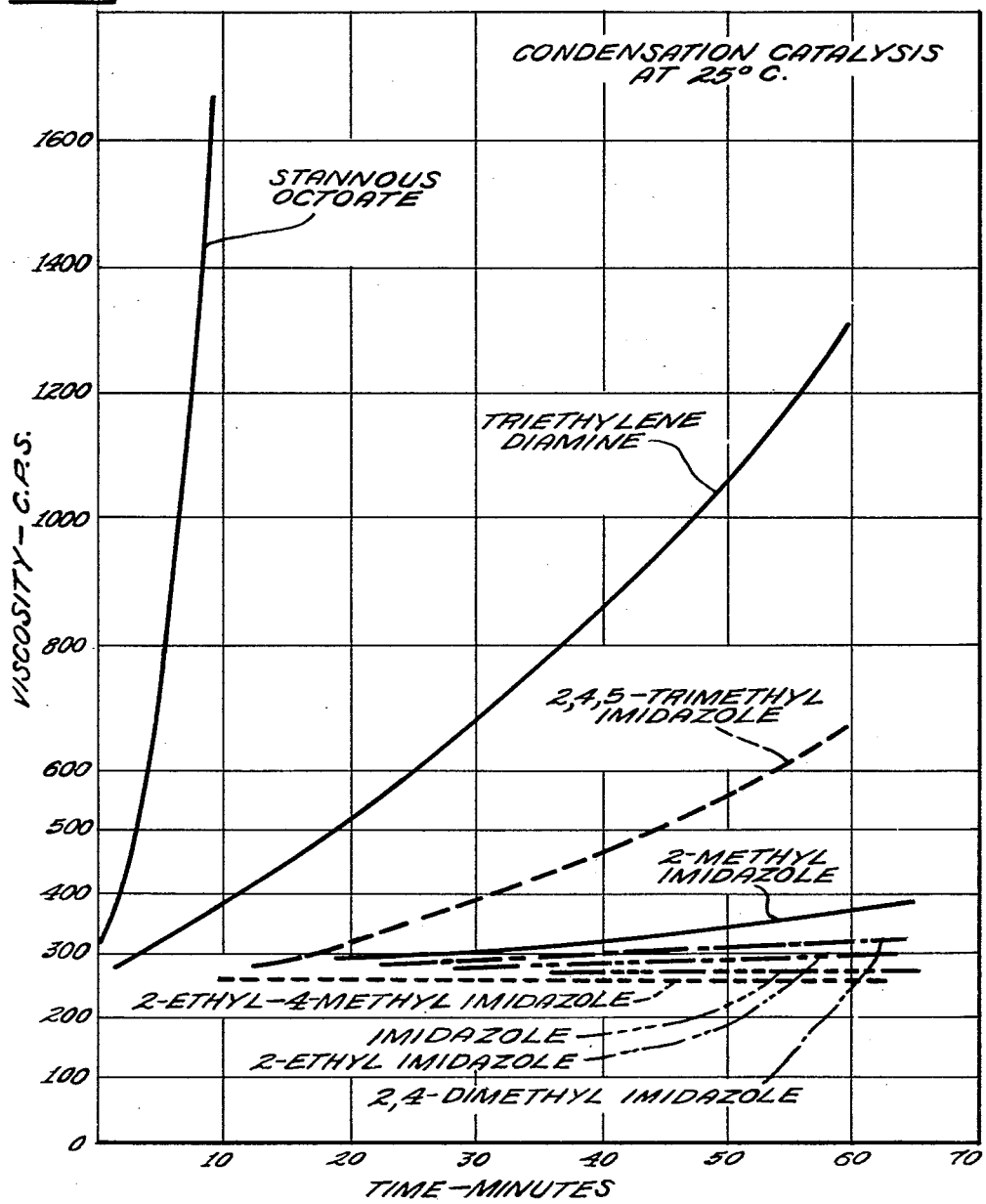

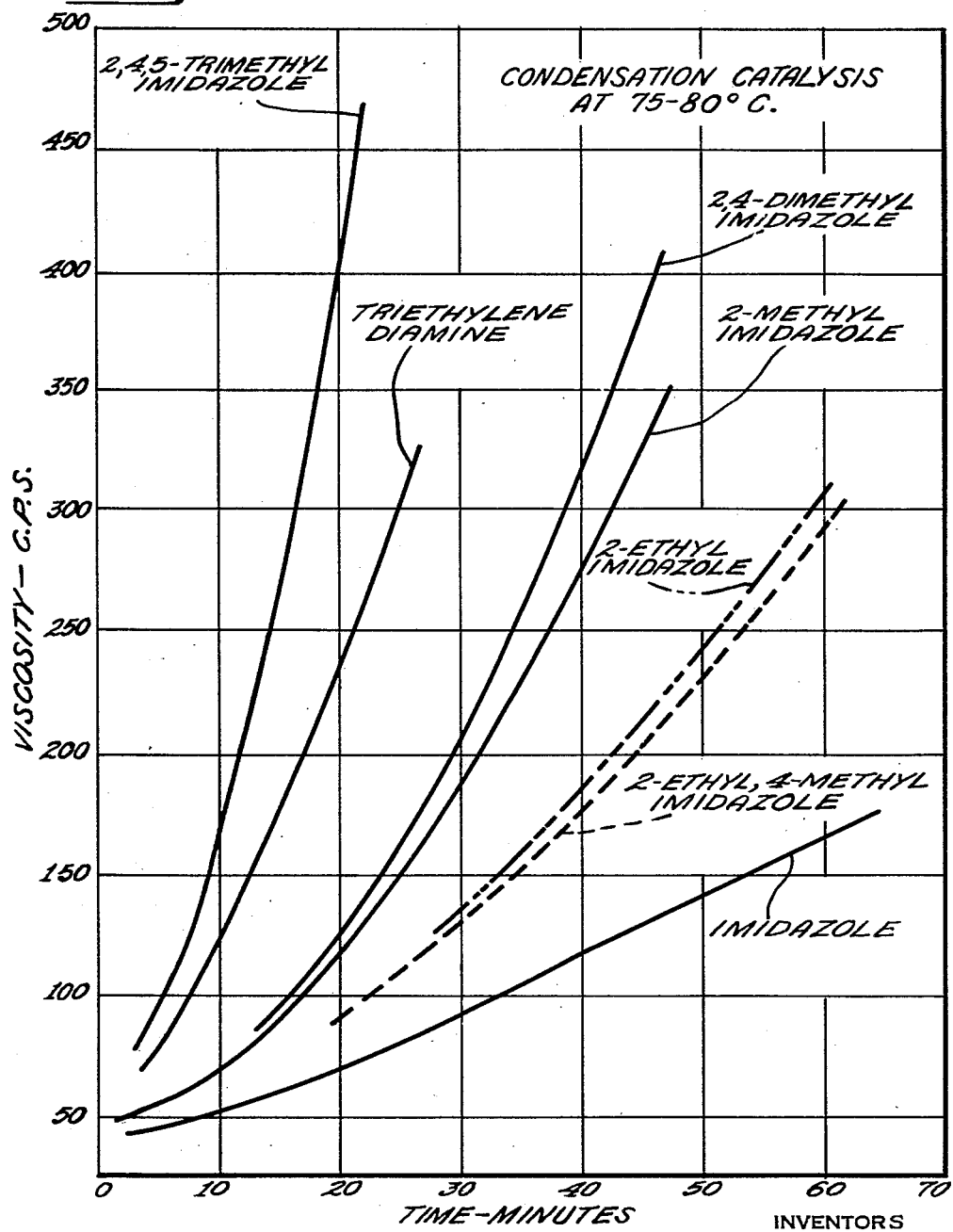

The present invention relates to the production of polyurethane high molecular weight condensation products and is particularly concerned with formulations for such products employing novel catalysts of selected activity for promoting the reaction between the organic polyisocyanate and the organic polyhydroxy compound in polyurethane foams as well as in non-cellular products, and/or the reaction of the polyisocyanate with water releasing $CO_2$, which serves as a blowing agent in expanding the resin in the case of such foams. The non-cellular polyurethane products include elastomers, coatings, adhesives, films and the like.

Polyurethane foams, both of the rigid and flexible type, are well known as products of reaction of a long chain polyol resin with an organic isocyanate, most usually an arylene diisocyanate. Typical formulations used in the preparation of such foams include as essential components a resin containing two or more hydroxyl groups per molecule, a diisocyanate and a catalyst. The blowing agent may be a gas, such as $CO_2$, formed in the reaction as when water is included in the formulation to react with isocyanate groups, or an external blowing agent may be included in the form of a liquid capable of vaporizing at or below reaction temperature, such as Freon.

Among the more generally employed polyols that have been employed in polyurethane foam formulations are hydroxy-terminated resins such as (1) hydroxy polyesters of from about 500 to 5000 molecular weight prepared by esterification of a polyhydric alcohol (with or without ether linkages) and a polyfunctional carboxylic acid, or (2) polyalkylene ether glycols of from about 500 to 5000 molecular weight.

Catalysts previously found effective in polyurethane foam formation have been of the tertiary amine type. Among these, there have been chiefly employed in commercial foam formulations N-alkyl morpholines, triethylamine, and, more recently, triethylenediamine (1,4-diazabicyclo-(2.2.2)-octane). Secondary amines and, in general, those compounds containing the grouping of

have been described by workers in the art as unsuitable for use as catalysts in polyurethane polymer formation, since such compounds having secondary amino groups are eliminated by reaction with isocyanates to form ureides.

In prior patent application Serial No. 804,884 of Harold A. Green, filed April 8, 1959, and now abandoned, of which the present application is a continuation-in-part, there is described the use of 2-alkyl imidazoles as catalysts in production of polyurethane foams. The present invention is based on the discovery that not only the 2-alkyl imidazoles, but also unsubstituted and more highly substituted secondary imidazoles exhibit useful catalytic activity in polyurethane formulations utilizing reactions between polyol compounds and organic diisocyanates. By secondary imidazoles is meant those imidazoles which contain hydrogen on the secondary nitrogen of the ring. These secondary imidazoles are unique in that, contrary to expectation and in contrast to other secondary amine compounds in general, they do not react with isocyanate to form ureide, which would become incorporated in the polymer and thereby be removed from the catalyst system.

Extensive investigation of the properties and catalytic behavior of imidazole compounds has now led to the further important discovery that these secondary imidazoles are uniquely thermally sensitive as catalysts, in that even those secondary imidazoles which have quite low activity at room temperature have unusually increased activity with moderate temperature elevation and some of these have at the higher temperature an activity approaching or exceeding the most active tertiary amine catalysts known. Thus, the catalytic activity of secondary imidazoles as measured either by the rate of $CO_2$ evolution in the water-isocyanate reaction or as determined by the promotion of reaction between high molecular weight polyols with isocyanates, is increased many fold as the temperature is raised from room temperature (25° C.) to about 75° C. This high temperature coefficient of catalytic activity observed with the secondary imidazoles is not found in the case of tertiary amine or other catalysts.

This remarkable behavior of the secondary N-imidazoles, without being bound by the theory advanced, is believed to be due to the fact that these compounds are highly associated at room temperature by hydrogen bonding. Average molecular weights as high as 1500 have been found for 4-methylimidazole in 0.6 molar benzene solution at the freezing point. With increased temperature, or polar solvation, the average molecular weight drops (e.g., average molecular weight of 4-methylimidazole in boiling benzene at 80° C. is about 190). As dissociation occurs, more catalyst sites (nitrogen-associated electron pairs) become available and the catalytic activity increases.

The unique properties of these imidazoles that distinguish them from related nitrogen bases are as follows:

(1) Their secondary —NH group is inactive and fails to react with isocyanates.

(2) The catalytic activity of these imidazoles is relatively low at room temperature.

(3) The catalytic activity of these imidazoles has a temperature coefficient significantly larger than (at least two or three times as large as) the temperature coefficient of other nitrogen bases used customarily as catalysts in polyurethane synthesis.

(4) Because of this high temperature coefficient, secondary imidazoles become particularly active at higher temperatures, say above 50° C., and therefore are particularly useful when used either in cases in which the reaction is carried out at elevated temperature, or in conjunction with other catalysts that initiate the reaction at a lower temperature and provide the heat necessary to raise the temperature to the point at which the imidazoles can develop their optimum activity.

The high coefficient of temperature activation exhibited by secondary imazoles is beneficially utilized in accordance with certain aspects of the present invention in promoting reactions between isocyanates and organic hydroxy compounds, particularly high molecular weight polyols, by methods and formulations wherein the catalytic activity of these imidazoles is initiated by suitable elevation of temperature. Such induction of the catalytic activity is brought about by provision of a heating medium external to the reaction system or by initiation of an exothermic reaction within the system as between isocyanate and hydroxyl groups, autogenically or through the medium of a co-catalyst having sufficiently high activity at ambient temperature.

The secondary imidazoles are particularly active in catalyzing the isocyanate-water reaction. They are generally less active than several of the known polyurethane catalysts in promoting the polyol-diisocyanate reaction. By use of the two catalysts, i.e., the secondary imidazole and a highly active co-catalyst of the tertiary amine type or of the metal salt type (tin soaps or tin salts, for example), greater flexibility is provided in controlling the properties of the ultimate foam, since thereby the rate of the water-diisocyanate reaction (blowing) can be regulated somewhat independently of the polyol-diisocyanate (condensation) reaction.

In accordance with another aspect of the present invention, polyurethane foam compositions are provided containing secondary imidazole as catalyst alone or in combination with more active catalysts promoting acceleration of the reaction between polyols and organic diisocyanates. In one preferred embodiment of the invention, the more active catalyst is a higher aliphatic carboxylic acid salt of stannous tin.

The high temperature coefficient of activity is advantageously utilized in co-catalyst systems in that the exotherm obtained by initial reaction in the presence of the more active co-catalyst raises the temperature of the system to a sufficient degree to activate the secondary imidazole as a catalyst.

The temperature activation of the secondary imidazoles can also be utilized to advantage in single catalyst systems wherein delayed action is desired in foam production, for example, in production of foamed products from warmed mixes.

The secondary imidazoles which can be utilized in practice of the present invention correspond in general to the formula

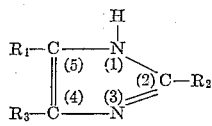

in which $R_1$, $R_2$, and $R_3$ are hydrogen, alkyl or benzyl, or $R_1$ and $R_3$ together form a tetramethylene chain attaching to the indicated 4–5 positions of the imidazole nucleus as in the case of

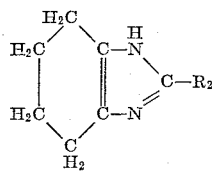

4,5-cyclotetramethylene imidazoles (tetrahydrobenzimidazoles) in which up to 2 of the hydrogens attached to carbon of the tetramethylene chain may be replaced by methyl.

The preferred compounds are those in which there is present on at least one of the positions 2, 4, 5 of the imidazole ring a short chain alkyl substituent and the total number of carbon atoms included in the substituents $R_1$, $R_2$, and $R_3$ does not exceed 12.

Among other C-hydrocarbon substituted secondary imidazoles which have been found temperature-sensitive in promoting polyurethane reactions, there are included: 2-propyl imidazole, 2-butyl imidazole, 2-benzyl imidazole, 2-benzyl 4-methyl imidazole and 2-butyl 4-methyl imidazole. Those compounds in which the total number of carbon atoms contained in the substituents $R_1$, $R_2$, and $R_3$ exceed 12, while operative as catalysts in promoting the hydroxyl-isocyanate reaction, are of comparatively low activity even at the higher temperatures used in practical operations, and are less preferred.

The secondary imidazoles can be prepared in general by the methods described in Erner, U.S. Patent No. 2,847,417. Thus by reaction of 2,3-diamino-butane with acetic acid, 2,4,5-trimethyl imidazole is obtained. The corresponding triethyl compound is formed from 3,4-diamino-hexane and propionic acid.

While numerous polyisocyanates have been suggested as suitable for reaction with the polyols to produce urethanes, including naphthalene diisocyanates, hexamethylene diisocyanates, and even certain aliphatic diisocyanates, most commercial foam formulations employ toluene diisocyanate generally in the form of the 2,4-isomer with or without inclusion of a lesser amount of the 2,6-isomer.

In typical practice for foam production, using the "one-shot" technique, all of the ingredients except the isocyanate are premixed and the latter then added to effect reaction. In other systems, all or part of the isocyanate is pre-reacted with the polyol to produce an isocyanate terminated prepolymer, which is then reacted with additional reactant such as water in the presence of catalyst to obtain foams of desired properties. The following 13 examples relate to foam production.

*Example I*

The components used in the formulation were:

| | Parts by wt. |
|---|---|
| Diol-PPG 2025 [1] | 200 |
| Triol-LG 56 [2] | 100 |
| Tolylene diisocyanate (TD 80) [3] | 115 |
| Organo-silicone stabilizer (X–520) [4] | 1.5 |
| 2-methylimidazole | 4.5 |
| Water | 8.7 |

[1] Diol-PPG 2025 is a polypropylene glycol of about 2025 molecular weight.
[2] Triol-LG 56 is a glycerine polypropoxide triol of about 3000 molecular weight and having a hydroxyl number of 56.
[3] TD 80 is a mixture of 80% 2,4-isomer with 20% of the 2,6-isomer of tolylene diisocyanate.
[4] X–520 is a silicone compound made by blocked polymerization of a polypropylene glycol with dimethyl silicone.

The 2-methylimidazole was first dissolved in the water and the solution blended with all of the other components except the diisocyanate by mixing with a high speed agitator for five seconds. The diisocyanate was then run into the dispersed mixture with further agitation for five seconds. The mixture was then poured into a mold. Creaming was almost instantaneous. Maximum foam rise was noted at about 2.5 minutes. The obtained flexible foam showed good cell structure, good stability and negligible shrinkage on aging.

In the above run a polyether type polyurethane foam was produced by the "one-shot" technique, which type of operation has been possible heretofore with only few of the catalysts otherwise useful in polyurethane formulations.

The hydroxy polyethers typically employed in polyurethane foam formulations have molecular weights of 2000 or more and are of a type including recurring

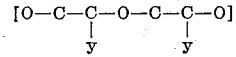

groups in which $y$ is H or methyl.

*Example II*

The components used in the formulation were:

| | Parts by wt. |
|---|---|
| Polypropylene glycol (PPG 2025) | 200 |
| Triol-LG 56 | 100 |
| Tolylene diisocyanate (TD 80) | 115 |
| Silicone stabilizer (X–520) | 2.2 |
| Triethylene diamine | 0.6 |
| 2-methylimidazole | 1.5 |
| Water | 8.7 |

The two catalysts (triethylene diamine and 2-methylimidazole) were dissolved in the water and mixed with the other ingredients except the isocyanate, which latter was added after initial rapid agitation and the mixing continued at 875 r.p.m. for 5 seconds. The mixture was poured into prepared molds. Cream time was almost instantaneous with maximum foam rise occurring in 60–70 seconds. A foam of well developed cell structure and good stability was obtained.

By the use of the alkyl imidazole as co-catalyst in the above formulation the quantity of triethylene diamine was reduced to about one-half the amount that would be needed in this formulation if used alone. Similar reduction in the quantity of tertiary amine catalyst by replacement with alkyl imidazole is possible in typical formulations made with sorbitol polyethers.

In the foregoing examples, the preparation of "one-shot" polyether foams is described. It will be understood that the use of the alkyl imidazole as catalyst or co-catalyst is not limited thereto, but that the alkyl imidazole can be substituted in whole or part for the tertiary amine catalyst used in conventional polyether foam formulations using the prepolymer technique. The alkyl imidazole can also be used in polyurethane foam products based on the use of polyester intermediates such as those derived from polymerized higher fatty acids (dimer acids), reaction products of a polyhydric alcohol or polyhydric ether-alcohol with a polycarboxylic acid, such as diethylene glycol adipate, etc.

*Example III*

A typical formulation for an ester type flexible polyurethane foam is as follows:

|  | Parts by wt. |
|---|---|
| Hydroxy polyester resin (hydroxy No. 60–65) mol wt. about 3000 | 100 |
| Tolylene diisocyanate | 28 |
| Lecithin | 5 |
| 2-methylimidazole | 0.7 |
| Water | 1.5 |

A highly critical evaluation of polyurethane condensation catalysts is obtainable in the continuous production of uniform polyurethane foam on the moving belt of the commercial foam machine. In this operation the reactants and catalysts are continuously proportioned into two streams which are mixed at high speed and ejected through a nozzle onto the moving belt.

*Example IV*

The efficiency of the alkyl imidazole catalyst was demonstrated in machine-mixed "one-shot" flexible polyether polyurethane foams in a number of runs, of which the following are typical. The polyol was charged at the rate of 4300 grams/min. into the mixing head, and separate streams of the TDI and of the mixture of catalyst and stabilizer in water run into the same mixing head and ejected continuously on the moving belt. Foaming and curing proceeded as the belt moved away from the mixing nozzle.

|  | A | B | C | D |
|---|---|---|---|---|
| Diol-PPG 2025 (parts by weight) | 71.5 | 71.5 | 71.5 | 71.5 |
| Triol-LG 56 (parts by weight) | 28.5 | 28.5 | 28.5 | 28.5 |
| TD 80 (parts by weight) | 36.8 | 36.8 | 36.8 | 36.8 |
| Silicone X-520 (parts by weight) | 0.7 | 0.7 | 0.5 | 0.7 |
| Water (parts by weight) | 2.95 | 2.95 | 2.95 | 2.95 |
| 2-methylimidazole (parts by weight) | 0.5 | 0.7 | 0.7 | |
| Triethylene diamine (parts by weight) | 0.2 | | | 0.2 |
| Appearance, Open Cells, Percent | 100 | 100 | 100 | 100 |
| Physical Properties (Cured 3 hrs. at 250° F. ambient humidity): | | | | |
| Density (lb./ft.$^3$) | 2.01 | 2.61 | 2.04 | 2.62 |
| Tensile strength (p.s.i.) | 19.2 | 13.6 | 8.80 | 13.2 |
| Tear resistance (lb./in.) | 3.45 | 3.10 | 2.60 | 2.25 |
| Compression Load (p.s.i.) for 25% deflection | 0.29 | 0.28 | 0.28 | 0.35 |
| Compression set at 50% deflection, Percent on original height | 6.7 | 10.0 | 12.4 | 7.8 |

Because of the described unique property of these secondary N-imidazoles, they are particularly advantageous when used in combination with stannous soaps in polyurethane foam formulations. Stannous octoate, for example, has exceptionally high activity in promoting polymer growth in the polyol-isocyanate (urethane) reaction. For example, the viscosity of the urethane mix containing stannous octoate goes from about 300 centistokes to about 900 in ten minutes, reaching 2000 or more in less than 18 minutes. In comparison, a urethane mix containing dibutyl-tin dilaurate after 20 minutes reached a viscosity of only about 700 centistokes, and dibutyl-tin dioctoate (2-ethyl hexoate) was even less active. On the other hand, stannous octoate is comparatively poor as a catalyst in promoting $CO_2$ evolution not only when compared with the dibutyl-tin salts $R_2Sn$—$(OOCR')_2$ but even as compared with the relatively low activity tertiary amine catalysts such as N-alkyl morpholines.

By combining the stannous soap, which is highly active at ordinary temperatures and highly selective for the urethane condensation reaction as distinguished from the blowing (ureide) reaction, with a secondary imidazole, which is highly temperature sensitive and thereby effective in promoting the latter reaction. in selected proportions, there is obtained a very desirable added factor of flexibility in regulating the timing and rate of these two reactions which can be utilized in controlling the desired properties of the ultimate foam. The stannous soaps provide the initial catalysis for chain growth and thereby furnish the exothermic heat for triggering the catalytic action of the secondary imidazole. In this combination the advantage of time delay in foaming is particularly evident. When the stannous tin soap is used as co-catalyst the polmerization reaction has a head start over foaming since the tin soap has little activity in promoting the water-isocyanate reaction. Greater production (pounds of foam mix per minute) can thus be obtained from a given machine. When the secondary imidazole is thermally activated it not only catalyzes foaming but also augments the urethane condensation reaction thus accelerating curing of the foam. The combination of these catalysts thereby obtains a balanced finished product.

The stannous soaps and secondary imidazoles are chemically and physically compatible. In use these may be introduced separately, together, or in various combinations with the other ingredients of the formulation. The liquid stannous soaps have good solvent properties for the imidazoles even at room temperature. If high concentrations of the imidazole are desired beyond their solubility in the stannous soaps, inert solvent may be added, such as diphenyl ether, to render the combination liquid at room temperature.

Typical formulations employing the above-described catalyst combinations are illustrated below:

*Example V*

Flexible foams were produced by the "one-shot" technique from the following formulations:

|  | Parts by weight | |
|---|---|---|
|  | A | B |
| Polypropylene glycol (2,000 M.W.) |  | 72 |
| Triol-LG 56 | 100 | 28 |
| Tolylene diisocyanate (TD 80) | 37 | 37 |
| Water | 2.9 | 2.9 |
| Organo-silicone oil | 1.0 | 1.0 |
| 2-methylimidazole | 0.3 | 0.3 |
| Stannous octoate (2-ethyl-hexoate) | 0.2 | 0.4 |

Formula A was used in a hand-mix operation and Formula B in a machine operation. The latter had a cream time of 16 seconds and a rise time of about 115 seconds. Both of these foams were rapidly self-curing, of good structural uniformity free from fissures and scorching, showing the characteristic sticky skin. This skin stickiness was quickly cured by brief heat treatment at 70–125° C. in hot air. These foams had a density of about 2.3 lbs./ft.$^3$ and their load bearing characteristics were very good. The thermal "triggering" of the imidazole catalyst was exhibited when the slowly rising foam suddenly accelerated and thereafter rapidly completed the foaming and curing process.

By the inclusion of auxiliary blowing agents, such as 10 parts of Freon or propylene oxide, in the above formulation the foam density was reduced to 1.45–1.50 lbs./ft.$^3$ while retaining reasonably good load-bearing characteristics.

*Example VI*

A "one-shot" rigid foam of good closed cell structure, dimensional stability, and fast-curing properties was produced by the following formulation:

| | Parts by wt. |
|---|---|
| Prodendrosorbitol (G 2410) [1] | 300 |
| Tolylene diisocyanate (TD 80) | 248 |
| Trichlorofluoromethane (Freon 11) | 45 |
| Organo-silicone oil (X 520) | 3 |
| 2-ethylimidazole | 0.52 |
| Stannous octoate | 0.15 |

[1] Sorbitol-polypropylene glycol of about 760 molecular weight, hydroxyl number 495, acid number 0.34.

All of the ingredients were blended for fifteen seconds and then poured into a mold. Initial creaming was noted in two minutes. By three minutes, creaming was completed and the mix started to rise, reaching full height and gelling in four minutes, and becoming quickly tack-free.

*Example VII*

Good rigid foams were readily mixed and produced with a triol (containing about 20% diols) of about 150 equivalent weight and having a hydroxyl number of 375, based on glycerine copolymerized with ethylene and propylene oxides (Dow ET 390–421); when cutting the total catalyst concentration to about 0.1 part per 100 of the polyols (in the ratio of about 3.5 parts 2-ethylimidazole to 1 of stannous octoate). Foaming in this instance began in 60 seconds and was complete in 100 seconds.

*Example VIII*

Good foams were produced using unsubstituted imidazole as catalyst; an example of which follows:

| | Parts by wt. |
|---|---|
| LG 56 | 300 |
| TDI | 112 |
| Trichlorofluoromethane | 10 |
| Imidazole | 1.5 |
| Stannous octoate | 0.9 |
| Water | 8.7 |
| Silicone oil | 3.0 |

This mixture had a cream time of 20–30 seconds and complete rise in 170 seconds. It was somewhat slower curing than the foams prepared with 2-methyl or 2-ethylimidazole. The skin tackiness was readily cured, however, by heating at 120° C. for one hour. The foam was of low density, i.e., 1.6 lbs./ft.$^3$.

*Example IX*

A number of runs made on the foam machine indicate that the combination of secondary imidazole with stannous octoate as catalyst produces foams equivalent in strength and load-bearing characteristics and in compression set, to foams produced from similar formulations employing diazabicyclo octane catalyst. The stannous octoate-secondary imidazole system may be advantageous from the standpoint of somewhat longer cream and rise time. The foaming systems using the combined catalyst were extremely stable and less apt to develop side splits or other physical defects with changes in machine conditions frequently encountered in systems employing a single catalyst.

Four separate runs were made on the machine from the following formulation. All runs produced good foams free from visual defects.

| | Parts by wt. |
|---|---|
| Polypropylene glycol (LPG 2025) | 72 |
| Triol (LG 56) | 28 |
| Tolylene diisocyanate (TD 80) | 36.6 |
| Water | 2.9 |
| Soluble silicone (XL 520) | 1.0 |
| Stannous octoate | 0.4 |
| Imidazole | 0.3 |

The nozzle was operated to inject part of the water containing the combined catalysts at an upper level and the remaining water containing the silicone at a lower level.

The several foams produced had cream times of from 9 to 15 seconds and rise times of 120 to 128 seconds.

The physical properties are tabulated below. Each of the foams prior to testing was given a 1 hour cure at 250° F. and ambient humidity.

| | A | B | C | D |
|---|---|---|---|---|
| Density, lb./ft.$^3$ | 2.01 | 2.09 | 1.93 | 2.08 |
| Tensile strength, p.s.i. | 10.4 | 12.5 | 22.6 | 22.5 |
| Tear resistance, lb./in | 2.6 | 2.6 | 4.5 | 5.0 |
| Compression-deflection, p.s.i.: | | | | |
| 25% | 0.39 | 0.38 | 0.41 | 0.45 |
| 50% | 0.48 | 0.48 | 0.50 | 0.55 |
| 65% | 0.58 | 0.60 | 0.63 | 0.71 |
| 75% | 0.81 | 0.81 | 0.84 | 0.93 |
| Compression set at 50% after humid aging (22 hrs. at 158° F., 5% relative humidity): Percent original height | 7.0 | 8.9 | 5.9 | 6.9 |

*Example X*

The following formulation may be employed for preparation of quick-setting rigid foams from alkyl ester resins of high hydroxyl number.

| | Parts by wt. |
|---|---|
| Glyceryl adipate phthalate (from 4 mols glycerine, 2.5 mols adipic acid and 0.5 mol phthalic anhydride; hydroxy number about 300, acid number about 12, 0.4% $H_2O$) | 100 |
| Tolylene diisocyanate | 80 |
| Water | 2.05 |
| 4-methylimidazole | 0.25 |
| Stannous octoate | 0.30 |

The resin is mixed with the diisocyanate and the remaining ingredients added as an aqueous solution which is blended in by stirring. The reaction mixture warms up in about 1 to 2 minutes at which time it is poured into a mold. The mixture therein foams and forms a stable rigid product in 1 to 3 minutes, which is self-curing. Curing and surface hardening can be accelerated, if desired, by heating the product in an oven at about 120° F. for from 1 to 3 hours.

Ready-mixed catalyst combinations for various types of formulations may be prepared by dissolving the secondary imidazole in the liquid stannous soap. At room temperature 20–30% by weight of the 2-methylimidazole will dissolve in stannous octoate; at 97° C. as much as 43% by weight will be dissolved. 2-ethylimidazole is more soluble, obtaining 43% concentration at room temperature. Equal parts of 2-methyl- and 2-ethylimidazole are soluble to 43% concentration in stannous octoate at 45° C. For most typical formulations the imidazole/stannous soap weight ratio will lie in the range of from about 0.5/1 to 5/1, and the combined catalyst will be used in amounts of from about 0.25 to 1.0 part per 100 of polyol.

A convenient catalyst combination for wide use may be made up by compositing 3 parts of secondary imidazole with 1 to 2 parts of the tin soap, and sufficient inert solvent added to maintain the two in liquid solution at about room temperature. This will require addition of about 2 parts of diphenyl ether. Other inert solvents include dioxane, diethylene glycol dimethyl ether, butyl phthalate, 2-ethyl-hexyl fumarate, etc. Reactive solvents such as dipropylene glycol, PPG 2000, etc. may also be used in suitable instances. If it is desired to employ a higher ratio of imidazole to stannous soap than that contained in the ready-mixed catalyst solution, the same can be adjusted by further addition of more imidazole in the desired quantity in the mixing or added to one of the compatible components of the mix.

Examples of other stannous soaps that can be similarly employed include:

Stannous laurate
Stannous decanoate
Stannous azelate
Stannous myristate, etc.
Stannous oleate Besides imidazole (which has a secondary-N structure) and the secondary imidazoles named above which are substituted only in the 2 or 4 position, there may be employed secondary imidazole compounds containing the alkyl substituent in the 5 position or those having, in addition, an alkyl or non-interfering non-functional substituent on one of the other carbons of the ring, such as 2,4-dimethylimidazole; 2 - ethyl-, 4-methylimidazole, etc. These, as well as 2 - ethylimidazole, have low melting points and may be desirable for that reason in marketing ready-to-use liquid catalyst combinations with tin soaps.

For advantageous use as as co-catalysts in the system with secondary imidazoles wherein it is desired to develop the required exotherm for initiating catalyst activity of the imidazole, there came into consideration those catalysts of high activity at room temperature which exhibit rapid development of an exothermic rise in temperature of the reaction mixture, including diisocyanate and polyol, at least in the magnitude of 0.1° F./sec., of which the tin compounds and 1,4-diazabicyclo-(2.2.2)-octane are representative.

A foaming composition that permits hand-mixing of polyurethane ingredients in small lots has long been sought for custom shops. Whereas in machine runs of slab foams as on the Bayer-Hennecke machine rapid mixing and reaction are essential, such operation is suited only to mass production of a uniform slab-foam stock. The catalyst-isocyanate-polyol-water and silicone are mixed in the machine nozzle and deposited on the moving belt as a "creaming" reactive mixture within less than a second of elapsed time.

In such applications, secondary imidazoles as a group are far less active and therefore not considered practical. However, with the use of "slow" secondary imidazoles and thermal activation, foam manufacture can be safely and successfully done on a custom shop basis, as seen from the following illustrative example.

*Example XI*

| | Parts by wt. |
|---|---|
| PPG 2000 | 100 |
| TDI | 37 |
| Organo-silicone (DC 199) | 0.5 |
| Imidazole | 0.5 |
| Water | 2.9 |

The tolylene diisocyanate, silicone and imidazole are mixed and heated to effect solution of the catalyst. At a temperature of about 70–75° C. a solution of polypropylene glycol and water is added with effective mixing of the two reactant streams, as in the Bayer-Hennecke machine. The creamy mixture is pumped into molds or onto a slabbing belt and the foam product formed, rising to maximum height in 2 minutes and self-curing in 60 minutes.

From numerous other runs on machine-made flexible foams, it was observed that the foaming system employing proper ratios of tin salt and secondary imidazole was exceptionally stable from the standpoint of duplication of results and these mixed catalyst systems (with secondary imidazole) were less sensitive to changes in machine conditions often found to give rise to development of physical defects when employing tertiary amine or metal salt catalyst alone. A cream time of 8–12 seconds with a rise time of 80–120 seconds, obtained in these mixed catalyst systems, is especially desirable for continuous machine production of flexible foams. The better physical properties of the mixed catalyst system using secondary imidazole are particularly evident in the samples employing higher levels of tolylene diisocyanate.

The exceptionally high activity of the secondary trialkyl imidazoles at elevated temperature renders these compounds especially desirable for use in a machineless pot mix method for making foams, taking advantage of the slow creaming at room temperature and rapid catalysis after the system is warmed by co-catalyst addition or application of external heating.

*Example XII*

| | Parts by wt. |
|---|---|
| Dow 11–300 resin (glycerine triol) | 300 |
| TD 80 | 105 |
| Organo-silicone (DC 199) | 3.0 |
| 2,4,5-trimethylimidazole | 1.5 |
| Water | 9.0 |

The catalyst was dissolved in the resin followed by the organo-silicone and the diisocyanate then stirred into the mixture with a spatula until a homogeneous composition was obtained (about 10 seconds). The water containing a small amount of water soluble polyethylene glycol polymer as a thickener, was then added and stirring continued for 45 seconds until creaming was evident. The mix was poured into an open box mold where foaming continued to reach full height in about 135 seconds. The foamed product was surface-cured in an oven at 70° C.

*Example XIII*

In 300 grams of glycerine propoxide triol (LG 56) there was dissolved with stirring and gentle warming 0.9 gram of 2-methyl-tetrahydrobenzimidazole. After cooling the solution, there were dissolved therein with stirring 3 grams of organo-silicon (DC 199) and 0.3 gram of stannous octoate, followed by consecutive addition of 108 grams tolylene diisocyanate (TD 80) and 8.7 grams of water.

The mixture was well stirred for eight seconds and poured into a mold. A smoothly rising foam resulted, which became tack-free rapidly and showed good elastic properties.

The choice of any particular secondary imidazole may vary with the system or formulation in which it is to be used as well as with the procedures utilized and the desired properties of the ultimate product. For use in the production of polyurethane plastics or elastomers by the conventional reaction of an organic polyisocyanate, typically tolylene diisocyanate, with a high molecular weight polyol compound such as polyhydric alcohol, ether alcohol, or ester; the preferred compounds are those in which the hydrocarbon substituent attached in one or two of the positions 2, 4 and 5 on the imidazole ring is an alkyl group of one to two carbon atoms (methyl or ethyl), these being more active as catalysts than unsubstituted imidazole and than the corresponding aryl imidazoles or the higher alkyl imidazoles in which, for example, phenyl, octyl, nonyl, or heptadecyl groups are present.

While the catalytic activity of the imidazoles at suitable temperature may also be evidenced in other related reactions between organic isocyanates and compounds containing an active hydrogen (as determined, for example, by the Zerewitinoff method) including among these compounds containing typically hydroxyl, carboxyl, primary or secondary amino groups, the chief practical interest lies in the use of these secondary imidazole catalysts in reactions between organic isocyanates with polyol compounds, these being presently most important commercially in connection with the production of various flexible and rigid polyurethane plastics, including polyurethane coatings and elastomers.

Typical polyol compounds which have been used in high molecular weight polyurethane plastic and resin compositions include:

(a) Hydroxy polyester compounds illustrated by esters of polycarboxylic acids with polyhydroxy alcohols (alkyd resin type) in general and particularly adipates and phthalates of glycerol, glycols, and of glycol ethers; hydroxy esters of dimerized higher fatty acids with dihydric or polyhydric alcohols.

(b) Polyether glycols (diols) of 500 to 3000 or higher molecular weight, for example, 1,4-butylene oxide polyglycol and mixed polypropylene-polyethylene glycols; so-called "triols" formed from trifunctional polyols by condensation with ethylene oxides and/or propylene oxide, using as trihydroxy base glycerine or trimethylol propane; as well as higher hydroxy compounds based on hexahydric alcohols such as sorbitol.

(c) Glycol, glycerine or other polyhydric alcohol derivatives of alkylene polyamines, such as N,N'-tetrakis-(2-hydroxypropyl) ethylene diamine.

(d) Castor oil and its derivatives including ricinoleic acid esters, ricinoleyl alcohol and condensation products of castor oil with glycols or with diglycolic acid.

While tolylene diisocyanate has been the one most frequently employed in foamed polyurethanes, particularly mixtures of 2,4 and 2,6 isomers, these, as well as other organic polyisocyanates, have been used in non-cellular polyurethane formulations of various types, including, for example: m-phenylene diisocyanate, hexamethylene diisocyanate, 4,4'-methylene bis-(phenyl isocyanate), naphthalene diisocyanate, triphenyl-methane triisocyanate. Also included are the prepolymers having terminal isocyanate groups formed by condensation with polyols, and the dimers and trimers of aryl diisocyanates.

The above examples of polyols and polyisocyanates are merely illustrative of the wide range of formulations in which the catalysts of the invention can be employed in non-cellular polyurethane formulation and are by no means intended as exhaustive or limiting. In fact, the mixed catalyst systems described can generally be substituted, with greater or lesser advantage, in most known formulations employing active catalysts for promoting polyurethane reaction.

In those instances in which there is no active co-catalyst employed in the formulation to provide the required temperature elevation for initiating the activity of the secondary imidazole, all or part of the components and reactants to form the desired polyurethane may be admixed with the imidazole at room temperature and the mixture then heated in any suitable manner to required reaction temperature, as above about 50° C., or the mixing itself may be carried out at appropriate elevated temperature to effect the desired reaction. In those formulations in which an active co-catalyst is employed, which has the required activity at ambient temperature, external heating will not ordinarily be required to initiate the reaction, although in some instances additional heating may be desirable to shorten the ultimate curing time.

Reference has been made to the use with the imidazole, for providing temperature elevations by exothermic reaction, of co-catalysts which are active at low or room temperature. There are various ways known in the art for testing or determining activity of catalysts, many of which are described in the literature [see, for example, A. Farkas and K. G. Flynn; J. Am. Chem. Soc., vol. 82, p. 642 (1960); and literature references there cited]. A familiar test of catalyst activity for promoting the isocyanate-hydroxyl (urethane) reaction is based on the determination of rate constants for given catalysts at selected concentrations in promoting reaction of a model system comprising phenyl isocyanate and 2-ethyl hexanol in standard solvents (benzene or dioxane), as compared with the uncatalyzed reaction. In these tests triethylene diamine (1,4-diazabicyclo-(2.2.2)-octane) has been found to have an activity of at least 4 to 5 times as great as other commercial tertiary amine catalysts tested; only the metallic catalysts, such as stannous octoate and dibutyl tin dilaurate have been found to have the high order of activity comparable to 1,4-diazabicyclo-(2.2.2)-octane. Other known tests of catalyst activity in the urethane reaction utilize as the model system polypropylene ether glycol and tolylene diisocyanate. Activity of the various catalysts can be compared by determining the increase in viscosity of the reaction mixture as a function of reacting time. By comparing the rate of viscosity increase for the system at room temperature for any given catalyst with that exhibited by the same catalyst at higher temperature (generally at about 70° C.) the thermal coefficient of activity can be determined for that catalyst. Instead of measuring the rate of viscosity increase at a given temperature, the activity of polyurethane catalysts can be compared on the basis of their effect on the rate of exothermic heat evolution in a model system. A typical test system is one employing 350 grams polypropylene glycol (M.W. 1000) and 117.5 grams of tolylene diisocyanate (80–20) to which the catalyst is added in Cellosolve acetate solvent. Based on observed data at 0.1% catalyst concentration, respectively, (a) during the first 15 seconds and (b) to time of reaching maximum temperature, of numerous commercial catalysts tested, only stannous octoate, dibutyl tin dilaurate and 1,4-diazabicyclo-(2.2.2)-octane showed rates of temperature rise in excess of 0.1° F. per second, rating in the order named. The others including tetramethyl butane diamine, triethyl amine and N-ethyl morpholine, showed activity levels of less than half that of 1,4-diazabicyclo-(2.2.2)-octane. Taking the uncatalyzed reaction as unity, these catalysts showed an order of reactivity in the 15 second exotherm test as follows:

TABLE 1

| | Order of Reactivity | Rate, ° F./sec. |
|---|---|---|
| Stannous octoate | 200 | 0.20 |
| Dibutyl tin dilaurate | 200 | 0.20 |
| 1,4-diazabicyclo-(2.2.2)-octane | 150 | 0.15 |
| Tetramethyl butane diamine | 67 | 0.067 |
| Triethyl amine | 60 | 0.060 |
| N-ethyl morpholine | 50 | 0.050 |

At 0.5% catalyst concentration, stannous octoate and 1,4-diazabicyclo-(2.2.2)-octane showed activity levels in the 15 second test of over 5 times the magnitude of the other three amine catalysts listed above, while dibutyl tin dilaurate fell below 1,4-diazabicyclo-(2.2.2)-octane, but still showed several times the magnitude of the highest of the other named amine catalysts.

For use as co-catalysts in the system with secondary imidazoles to develop the required exotherm for initiating catalyst activity of the secondary imidazole, there come into consideration only those catalysts of high activity at room temperature which exhibit rapid development of an exothermic rise in temperature of the reaction mixture, at least in the magnitude of 0.1° F./sec., of which the tin compounds and 1,4-diazabicyclo-(2.2.2)-octane are representative.

The effect of temperature in activating secondary imidazole catalysts for the polyurethane catalysis will be appreciated from a comparison of the curves plotted in FIGURES 1 and 2, wherein these are compared with diazabicyclo octane at 25° C. and at 75–80° C., respectively, on the basis of viscosity change with time using as the model system 150 gm. of polypropylene glycol of 2000 molecule weight and 0.15 gm. of catalyst, ten milliliters of tolylene diisocyanate (TD 80) being added to the mixture. It will be observed in FIGURE 1 that at room temperature, the secondary imidazoles as a rule showed very little activity as compared to diazabicyclo octane (about 1/20 of that of diazabicyclo octane) while the tertiary imidazole has an activity of about 40% of that of diazabicyclo octane. At the higher temperature (FIGURE 2) the secondary imidazoles showed appreciable activity amounting to 23–57% of that of the diazabicyclo octane.

By plotting the time/viscosity curves of FIGURE 1, relative reaction rates were determined from the initial slopes of the several curves at 25° C. Taking the rate for diazabicyclo octane ($r=1$) as unity, the comparative rates for the other catalysts are given in Table 2 below. From the time/viscosity curves of FIGURE 2 (at 75–80° C.) similarly $r$ values were determined and related to the $r$ value for diazabicyclo octane, also tabulated in Table 2. The temperature sensitivity of each catalyst compared to that of diazabicyclo octane will be seen from columns 3 and 4 of the table.

TABLE 2

|  | 1<br>$r_{25}$ | 2<br>$r_{75}$ | 3<br>$\frac{r_{75}}{r_{25}}$ | 4<br>Percent activation |
|---|---|---|---|---|
| Diazabicyclo octane | 1.0 | 1.0 | 1.0 | 0 |
| 2-ethyl-4-methyl imidazole | 0.05 | 0.37 | 7.0 | 700 |
| Imidazole | 0.08 | 0.23 | 3.0 | 300 |
| 2-ethyl-imidazole | 0.09 | 0.40 | 3.3 | 330 |
| 2,4-dimethyl imidazole | 0.09 | 0.58 | 6.0 | 600 |
| 2-methyl imidazole | 0.12 | 0.55 | 4.5 | 450 |
| 2,4,5-trimethyl imidazole | 0.50 | 1.49 | 3.0 | 300 |

This unique temperature sensitivity of the secondary imidazoles can be used to particular advantage in several ways:

(1) In polyurethane molding compositions where appreciable "pot life" is desired; for example, where a molding composition is made up and a period of from one to 16 or more hours is needed to prepare and cast the molds. During the interval the condensation reaction is very slow at room temperature, but when the prepared mix including secondary imidazole as catalyst is poured into the warmed mold or the mixture warmed before pouring, the cast mix reacts rapidly to form the desired condensation product.

(2) In thermosetting cements the polyurethane adhesive mix including the dormant catalyst may be placed on the pieces to be joined, affording the operator time to locate and clamp these pieces in position. The set-up can then be heated, for example, by conveying through an oven, wherein the joined parts are sealed by heating.

Illustrative examples of certain of these applications of the secondary imidazole catalyst in non-cellular polyurethanes appear below:

*Example XIV*

An adhesive composition having good shelf life is made up from the following:

| | Parts by wt. |
|---|---|
| Polyethylene glycol (M.W. 375–400) | 400 |
| Tolylene diisocyanate | 350 |
| Imidazole | 2 |
| Organo-silicone (DC 199)[1] | 1 |
| Benzene | 110 |

[1] Hydrophobic alkylene-oxide silicone polymer.

The polyether glycol is added to the diisocyanate dissolved in benzene. The imidazole and silicone were then added and the solution allowed to precure by autogenous reaction. A viscous amber liquid results which is stable up to 12 months at 50° C. if kept free of water. The viscous precured adduct is mixed with the imidazole dissolved in benzene. Shelf life remains good for a month or more at ambient temperatures and up to 12 months at moderately low temperatures, e.g., 5° C.

The stable adhesive adduct is applied in a thin coating on the materials to be cemented, e.g., steel to glass. No further reactive cure is required other than volatilization of the solvent present. When the adhesive coated surfaces are tacky (in roughly 10 to 20 minutes) the pieces are pressed into contact and passed through heated (80–100° C.) rolls or held in a heated (100° C.) press for approximately 2 minutes to set and finally cure the adhesive. Bond strength is good immediately on leaving the press, however, full bond strength is developed on cooling. Glass bonded to steel in this example had tensile strengths of 800 to 1000 p.s.i., or an average bond strength of 900 p.s.i. This thermosetting adhesive is applicable wherever the work pieces are stable at temperatures of 100–120° C., for example, vulcanized rubber to steel, aluminum sheet to methyl methacrylate, etc.

*Example XV*

A modification of the above method permits a new technique of dry bonding. The above formulation is prepared using only 10 gm. of benzene to dissolve the organo-silicone. The resultant precured viscous liquid is mixed with the imidazole catalyst in benzene solution, cast and dried to a workable plastic sheet. Coupons of the dry adhesive, cut to size, are placed between the work pieces to be cemented and the sandwich, in this instance aluminum foil 0.001″ in thickness, adhesive film 0.001″ and cellulose acetate sheet 0.001″ are laminated, pressed through collandering rolls heated to 80° C. and cemented to a tough laminate in a press time of one minute at 150 pounds pressure. This aluminum-urethane-acetate sheet has a tensile strength of over 1500 p.s.i.

THERMOSETTING COATING COMPOSITIONS

Coating compositions are of particular value on paper, textiles, leather or metals. Especially in wire coatings polyurethane coatings exhibit highly desired gloss, water and solvent resistance, excellent electrical resistance, low gas permeability and high weather resistance. Because of the high reactivity of the polyol materials with isocyanates, it is customary to react the polyol, such as castor oil, with a portion of the diisocyanate up to the molar equivalent, thus to form a prepolymer to which the catalyst is added. The polymer-catalyst mixture has excellent storage stability with secondary imidazoles as catalysts, as seen from the example below.

*Example XVI*

(a)

| | Parts by weight |
|---|---|
| Castor oil | 380 |
| Diphenyl methane diisocyanate | 380 |

These two ingredients are stirred and heated by autogenic condensation to approximately 85° C. and further cooked for two hours at temperatures up to 140° C. The obtained prepolymer is allowed to cool and then there is added thereto with agitation (b)

| | Parts by wt. |
|---|---|
| 2,4-dimethyl imidazole | 3.8 |
| Organo-silicone (DC 199) | 0.4 |
| dissolved in | |
| Diphenyl methane diisocyanate | 200.0 |

The mixed catalyzed resin is storable at ordinary temperatures for months. In preparing coatings on wire, the wire is cleaned, dried and dipped successively in (a) organic isocyanate solution, (b) liquid resin prepolymer and passed through curing ovens at 80 to 110° C. for a reaction and curing time of about 3 minutes. Longer heating and curing times are permitted; however, closely adherent, dense coatings are produced in the lesser (3 min.) oven time.

Metal and plywood panels are similarly coated by dipping the clean dried piece into the polymer resin bath, then being conveyed mechanically through infrared heated ovens to obtain temperature activation of the catalyst at 80+° C. and final oven curing of the urethane coating at 125° C. for 20 minutes to one hour for maximum hardness.

STORAGE STABLE POTTING COMPOUNDS

The process of potting or encapsulating mechanical items, such as electrical or electronic components, has come into wide use in this rapidly growing industry. The advantages of such weither-proof, scratch-proof packaging is obvious, but the necessity of having tough coating materials to feed a manufacturer's assembly line requires compositions having low surface tension at ordinary temperatures to lay down a thin, smooth coating on contact and a stable composition that does not harden in air at ordinary temperatures, but condenses and hardens rapidly at moderately elevated temperatures. A potting composition that produces tough, flexible encapsulation essentially free of gas bubbles is illustrated in the following example.

Example XVII

|  | Parts by wt. |
|---|---|
| Castor oil | 760 |
| TDI | 640 |
| Hexylene glycol | 120 |
| 2-ethyl imidazole | 5.6 |
| Silicone oil | 7.5 |

The dried castor oil, TDI and glycol are mixed, with the secondary imidazole catalyst and silicone oil added and dissolved. The potting solution is fed through closed lines to a dipping pot where the conveyed mechanical goods are dipped, drained and rotated (to form an even non-dripping coat) as the article is conveyed to a heat-drying and preferably vacuum oven. The piece is heated rapidly to a minimum of 80° C. and held at this temperature approximately two minutes. To insure thinner, bubble-free enclosure the ovens are preferably heated by infrared lamps and for at least the first half of the oven travel time the conveyed parts move through a vacuum chamber to insure good degasification of the coating. The condensed and cured film is allowed to cool and the coated article packed in appropriate containers.

The specific advantage of potting compositions employing thermally-activated secondary imidazole catalyst will be seen from the following comparison:

Example XVIII

|  | Parts by wt. |
|---|---|
| Tolylene diisocyanate | 300 |
| Castor oil (dry) | 375 |
| Organo-silicone oil | 5 |

These components are mixed at room temperature and then heated gradually with agitation to 70° C. for not more than two hours to build up a prepolymer of about 40,000 centipoises at room temperature. The product is evacuated to <10 mm. Hg to remove gas bubbles. The vacuum is relieved with dry gas (nitrogen) and the prepolymer cooled to room temperature. This prepolymer mix is used in the following cases:

A. To a sample of the above prepolymer there is added 6 gm. of Quadrol (tetrakis-2-hydroxypropyl ethylene diamine) and the composition poured in a mold and placed in an oven to cure at 100° C. To obtain a good tough product about 18 to 20 hours are required for the cure.

B. To another sample of the above prepolymer there is added in addition to the Quadrol, 5 gm. of diazabicyclo octane. Because of the rapid catalysis of the cross-linking reaction there is produced an immediate stringy composition which adheres to the pot (with high material loss) and pours unevenly into the mold. Curing under these conditions is quite rapid with autogenous heat building up to 125° C. or more in a half-hour. The product is uneven in texture, not well adhered to the mold, and is overheated in thick segments to produce a dark bubbled product.

C. To a third sample of the above polymer there is added with the Quadrol 6 gm. of 2,4-dimethyl imidazole at room temperature. The composition is poured into a heated mold and the mold plus contents put under vacuum (10 mm. Hg) to degasify the mix. At temperatures of about 70° F. the condensation and cross-linking take place rapidly. The product is condensed and cured to a tough finely molded product in 60 to 80 minutes without further heating.

The catalytic effect of secondary imidazoles in polyurethane rubber formulations is seen from the following illustration:

Example XIX

|  | Parts by wt. |
|---|---|
| Adiprene L [1] | 100 |
| LG 56 | 85 |
| 2-methyl imidazole | 0.5 |

[1] Prepolymer of tolylene diisocyanate and polytetramethylene glycol (M.W. 2000); see SPE Journal, April 1959, p. 298.

The catalyst was added to the polyol and heated with stirring to dissolve the material. The solution was cooled to room temperature, the Adiprene added, and the resulting mixture stirred for five minutes. The experiment was repeated at room temperature and at 100° C.

In the room temperature run about 23 hours were required for the mixture to set to tacky consistency and about 44 hours to dry state, as compared with diazabicyclooctane as a control which set in about 2 hours to tacky state and 7.4 hours to dry state.

At 100° C. 2-methyl imidazole set dry in about 48 minutes as compared to about 27 minutes for the diazabicyclooctane.

A run made with 2-ethyl 4-methyl imidazole (requiring almost 80 hours at room temperature to set dry), when mixed at 100° C. set dry in 36 minutes.

The secondary short chain trialkyl imidazoles (methyl through butyl substituents) while having a room temperature activity in condensation and polymerization reactions (as measured by the described polypropylene glycol-tolylene diisocyanate model system) of one-third to one-fourth that of diazabicyclooctane, at higher temperatures (75–85° C.), the activity of the trialkyl imidazole approaches or exceeds that of diazabicyclooctane.

The following example is illustrative of a mixed catalyst system employing a fast-acting co-catalyst in association with a secondary imidazole, in a "one-shot" elastomer:

Example XX

|  | Parts by wt. |
|---|---|
| Polypropyleneglycol (M.W. 1000) | 100 |
| 2-methyl-tetrahydrobenzimidazole | 0.4 |
| N-phenyl-diethanolamine | 13.6 |
| Stannous octoate | 0.2 |
| Tolylene diisocyanate (80:20) | 30.3 |

The stannous octoate and the alkyl tetrahydrobenzimidazole compound were dissolved in the molten diethanolamine and the obtained solution mixed with the polypropylene glycol. The mixture was carefully degassed under vacuum (3 mm. Hg pressure) at 80–100° C. for twenty to forty minutes. The diisocyanate was then added to the degassed resin mixture and poured into a mold, then again briefly degassed under vacuum (50 mm. Hg. pressure) and returned to atmospheric pressure. The molded product was cured in the mold at 140° C. for two hours, then released.

The cured product released from the mold was of rubbery characteristics, stretching slowly with full recovery.

By using the slow-acting secondary imidazole compound, there is ample time delay to permit thorough mixing and degassing prior to and during molding, thereby avoiding or minimizing gas bubbles in the product.

The preparation of 2-methyl tetrahydrobenzimidazole by hydrogenation of 2-methyl benzimidazole is described in Helvetica Chemica Acta (1938), vol. 21, at p. 1693.

Obviously many modifications and variations of the invention as hereinbefore set forth may be made without departing from the spirit and scope thereof, and

What is claimed is:

1. In the method of producing polyurethane by reaction of an organic polyisocyanate with an aliphatic polyol compound selected from the group consisting of polyester polyols and polyether polyols, the improvement which consists in effecting said reaction in the presence of a catalyst comprising secondary imidazole of the formula

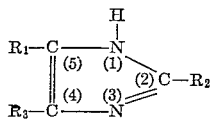

in which $R_2$ is a substituent selected from the group consisting of hydrogen, alkyl and benzyl, and $R_1$ and $R_3$ are substituents selected from the group consisting of hydrogen, alkyl, benzyl and a tetramethylene chain attaching to the 4 and 5 positions of the indicated formula, the total number of carbon atoms in the substituents $R_1$, $R_2$ and $R_3$ not exceeding 12.

2. The method according to claim 1 wherein the catalyst employed is a combination of such secondary imidazole and a more highly active catalyst exhibiting activity at room temperature in promoting isocyanate-polyol reaction with rapid development of an exothermic rise in temperature of the magnitude of at least 0.1° F. per second; said more highly active catalyst being selected from the group consisting of tertiary amines and tin salts.

3. The method according to claim 2 wherein said more highly active catalyst is triethylene diamine.

4. The method according to claim 2 wherein said more highly active catalyst is a stannous salt of a higher fatty acid.

5. The method according to claim 1 wherein said imidazole contains a short chain alkyl group on at least one of the positions 2, 4, 5 of the heterocyclic ring.

6. The method according to claim 1 wherein said imidazole is a 2-alkyl imidazole.

7. The method according to claim 1 wherein said imidazole is a 2-alkyl imidazole, the alkyl group containing one to two carbon atoms.

8. The method according to claim 1 wherein said imidazole is a 2,4-dialkyl imidazole.

9. The method according to claim 1 wherein said imidazole is 2,4,5-trialkyl imidazole, the total number of carbon atoms in the three alkyl groups not exceeding 12.

10. The method according to claim 1 wherein said catalyst is composed of a mixture of 2-alkyl imidazole and stannous octoate.

11. The method according to claim 1 wherein said catalyst is composed of a mixture of 2-alkyl imidazole and triethylene diamine.

12. The method of producing gas blown polyurethane foams which comprises reaction with organic polyisocyanate a hydroxy polyester 500 to 5000 molecular weight made from a polyhydric alcohol and a polyfunctional dicarboxylic acid, in the presence of a blowing agent and of catalyst comprising unsubstituted imidazole.

13. The method of producing gas blown polyurethane foam which comprises reacting aromatic diisocyanate with a polyalkylene ether glycol of 500 to 5000 molecular weight, in the presence of a blowing agent and of catalyst comprising secondary imidazole said secondary imidazole corresponding to the formula

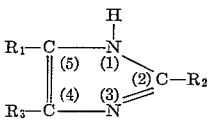

in which $R_2$ is a substituent selected from the group consisting of hydrogen, alkyl and benzyl, and $R_1$ and $R_3$ are substituents selected from the group consisting of hydrogen, alkyl, benzyl and a tetramethylene chain attaching to the 4 and 5 positions of the indicated formula, the total number of carbon atoms in the substituents $R_1$, $R_2$ and $R_3$ not exceeding 12.

14. The method of producing gas blown polyurethane foam which comprises reacting aromatic diisocyanate with water and with a polyalkylene ether polyol of 500 to 5000 molecular weight in the presence of catalyst comprising secondary 2-alkyl imidazole, said alkyl group containing 1–2 carbon atoms.

15. The method of producing gas blown polyurethane foam which comprises reacting tolylene diisocyanate with water and with a polyalkylene ether polyol in the presence of a catalyst mixture composed of a 2-alkyl secondary imidazole and triethylene diamine, said secondary imidazole corresponding to the formula

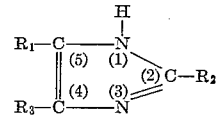

in which $R_2$ is a substituent selected from the group consisting of hydrogen; alkyl and benzyl, and $R_1$ and $R_3$ are substituents selected from the group consisting of hydrogen, alkyl, benzyl and a tetramethylene chain attaching to the 4 and 5 positions of the indicated formula, the total number of carbon atoms in the substituents $R_1$, $R_2$ and $R_3$ not exceeding 12.

16. The method of producing flexible one-shot polyurethane foam which comprises reacting tolylene diisocyanate with water and with a polyalkylene ether polyol of 500 to 5000 molecular weight in the presence of a catalyst mixture composed of a secondary alkyl imidazole and stannous octoate, said secondary imidazole containing an unsubstituted H attached to a hetero-N of the imidazole ring.

17. The method of producing rigid one-shot polyurethane foam which comprises condensing an organic diisocyanate with a glycol ether of a polyhydric alcohol in the presence of a catalyst mixture composed of secondary alkyl imidazole and stannous soap, and blowing the resinous condensate formed with a gaseous blowing agent, said secondary imidazole containing an unsubstituted H attached to a hetero-N of the imidazole ring.

18. The method of preparing non-cellular polyurethane resins which comprises mixing an organic polyisocyanate with high molecular weight organic polyol containing at least two active alcoholic hydroxy groups, in the presence of thermally sensitizable secondary imidazole catalyst, and heating the system to accelerate imidazole catalyzed reaction between hydroxy and isocyanate groups, thereby forming urethane linkages, said imidazole having structure corresponding to the formula

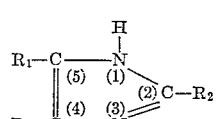

in which $R_2$ is a substituent selected from the group consisting of hydrogen, alkyl, and benzyl, and $R_1$ and $R_3$ are substituents selected from the group consisting of hydrogen, alkyl, benzyl, and a tetra-methylene attaching to the 4 and 5 positions of the indicated formula, the total number of carbon atoms in the substituents $R_1$, $R_2$ and $R_3$ not exceeding 12; said polyol being selected from the group consisting of polyester polyols and polyether polyols.

19. The method as defined in claim 18 wherein said heating is effected by external application of the heating medium.

20. The method as defined in claim 18 wherein said heating is effected by the exothermic reaction between isocyanate and hydroxy groups in the presence of a reaction-initiating amount of a highly active co-catalyst selected from the group consisting of triethylene-diamine and tin salts.

21. The method as defined in claim 18 in which said secondary imidazole is 2-alkyl imidazole.

22. The method as defined in claim 18 in which said secondary imidazole is 2,4,5-trialkyl imidazole.

23. The method as defined in claim 18 in which said heating is effected by autogenous exothermic reaction occurring in the system.

References Cited in the file of this patent

UNITED STATES PATENTS 3,055,845    Merten et al.  ---------- Sept. 25, 1962

FOREIGN PATENTS 210,411    Australia  -------------- July 18, 1957

OTHER REFERENCES

Barringer: "Rigid Urethane Foams-11 Chemistry and Formulation," Du Pont Elastomers Division Bulletin No. HR–26, April 1958, pages 6–8.